T. CARDINELL.
TIRE CASING SPREADER.
APPLICATION FILED OCT. 22, 1919.
1,350,779.
Patented Aug. 24, 1920.
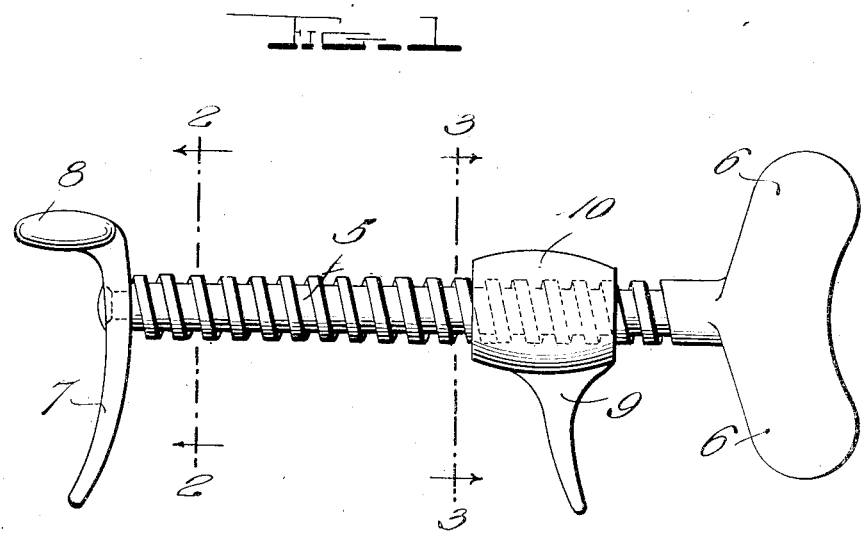
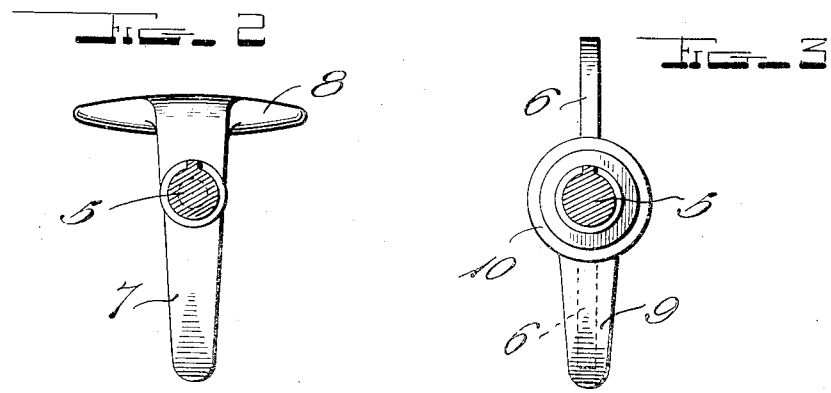
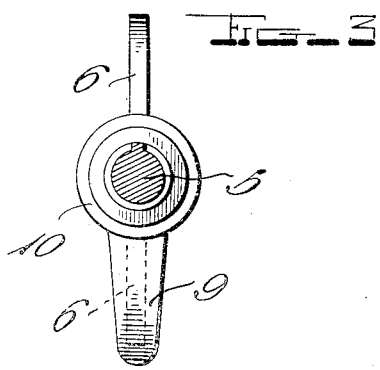
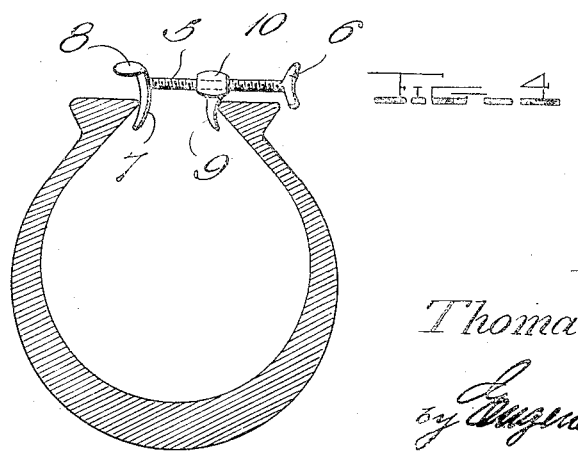
Inventor
Thomas Cardinell
by Eugene W. Johnson
Attorney

UNITED STATES PATENT OFFICE.

THOMAS CARDINELL, OF MOUND CITY, MISSOURI.

TIRE-CASING SPREADER.

1,350,779. Specification of Letters Patent. Patented Aug. 24, 1920.

Application filed October 22, 1919. Serial No. 332,405.

*To all whom it may concern:*

Be it known that I, THOMAS CARDINELL, a citizen of the United States, residing at Mound City, in the county of Holt and State of Missouri, have invented certain new and useful Improvements in Tire - Casing Spreaders, of which the following is a specification.

My invention relates to tire tools or spreaders for the casings of pneumatic tires, and the object of the invention is to provide a tool that is particularly adapted for use in spreading apart the casings of pneumatic tires, in order to repair the same or to insert a tube or patch within the casing, when the sides thereof are spread and held apart by the tool.

My invention consists of a spreader for the casings of tires which is made up of a threaded member or winged screw the end opposite the means for turning the screw having rotatively mounted thereon a horn and integral with the horn and preferably to one side of the screw a grasping portion which when held prevents rotation thereof and provides means for placing the spreader for use, the screw also being provided with a nut which carries a horn, the parts being assembled so that the horns or casing engaging members diverge for engagement with the edges of the casing.

In the accompanying drawings which form a part of my specification, Figure 1, is a side elevation of a tire-casing spreading tool, made to accord with my invention. Fig. 2, is a transverse section on the line 2—2, of Fig. 1. Fig. 3, is a transverse section on the line 3—3, and Fig. 4, is a view showing the application of the tool to a tire casing.

The tool may be said to consist of three parts or pieces, the screw 5 having at one end wings or projections 6, 6, the other end being reduced to provide means for attaching to said reduced end and to be in rotative engagement therewith a member 7, which is curved longitudinally and has therethrough an aperture to receive the reduced end of the winged screw 5, the parts being held together by upsetting the end of the screw after being passed through the aperture in the part 7. The part or member 7 has formed thereon so as to extend above or beyond the longitudinal axis of the screw a bulbous part 8, that constitutes a member that is adapted to be held by one hand of the user to guide the horn 7 and to hold it in engagement with the casing as well as to prevent rotation thereof when the screw is being turned.

The traversing member 9 has its nut 10 placed upon the screw 5, prior to attaching the member 7 to the reduced end of the screw, and such member 9 is curved to diverge from the member 7, the nut 10 being somewhat elongated to have a wide bearing upon the screw.

In operation the diverging horns or members 7 and 9 are positioned adjacent to each other and are placed within the tire engaging portions of the casing, the knob 8 on the horn 7 being grasped to hold the tool in position and the screw is turned to move the horn 9, which action will spread the casing apart, and hold the same spread while making repairs or inserting an inner tube.

The spreader for the casings of tires herein shown and described is simple in construction, and the parts are made up to avoid sharp angles which would be liable to injure the casing or a tire within the same, and provides a very efficient tool for the purpose designed.

The configuration of the parts may be varied within the scope of the claims, without departing from what I consider to be the subject matter of my invention, an essential feature being the diverging horns for engagement with the inner edges of a casing for tires, one of the horns being in traveling engagement with a screw and the other horn being in rotative engagement therewith, said horn having beyond the point of attachment to the screw a handle or grasping portion.

I claim—

1. A spreader for tire casings, comprising a screw one end having turning means the other end being reduced to provide a shouldered extension, a traversing nut mounted on the screw and having a horn or integral casing engaging member with a concave face, a second horn or casing engaging member rotatively attached to the reduced end of the screw and provided with an integral grasping member or knob-like handle which extends laterally and is positioned above the longitudinal axis of the screw.

2. A spreader for tire casings, comprising a bar provided with a continuous threaded portion between its ends and provided at one end with integral means for rotating the bar, an internally threaded member maintained in engagement with the bar to travel thereon when the bar is rotated said member having a horn-like projecting portion for engagement with one edge of a tire casing, and a member maintained in rotatable engagement with the end of the bar said member having a horn-like projecting portion for engagement with the other edge of the tire casing, and with an integral grasping portion or knob that is positioned to one side of the longitudinal axis of the bar and partially beyond the end of said bar.

THOMAS CARDINELL.